United States Patent
Lu (10) Patent No.: US 10,155,415 B1
(45) Date of Patent: Dec. 18, 2018

(54) SHOCKPROOF CASTER

(71) Applicant: Kuo-Yu Lu, Taichung (TW)

(72) Inventor: Kuo-Yu Lu, Taichung (TW)

( * ) Notice: Subject to any disclaimer, the term of this patent is extended or adjusted under 35 U.S.C. 154(b) by 0 days.

(21) Appl. No.: 15/841,041

(22) Filed: Dec. 13, 2017

(51) Int. Cl.
*B60B 33/00* (2006.01)
*B60B 33/04* (2006.01)

(52) U.S. Cl.
CPC ........ *B60B 33/045* (2013.01); *B60B 33/0042* (2013.01); *B60B 33/0049* (2013.01); *B60B 33/0057* (2013.01); *B60B 33/0068* (2013.01); *B60B 33/0073* (2013.01)

(58) Field of Classification Search
CPC .............. B60B 33/045; B60B 33/0042; B60B 33/0002; B60B 33/0028; B60B 2200/45; B60B 2900/212; B62B 2301/22; B62B 2301/20; B60G 11/22; B60G 11/225; B60G 2204/41; B60G 2300/084; B60G 7/04; A61G 2005/1078; A45C 5/04; Y10T 16/196; Y10T 16/212
See application file for complete search history.

(56) References Cited

U.S. PATENT DOCUMENTS

| | | | | |
|---|---|---|---|---|
| 2,738,542 A | * | 3/1956 | Clark, Jr. .............. | B60B 33/045 16/44 |
| 3,518,714 A | * | 7/1970 | Hager .................... | B60B 33/02 16/35 D |
| 6,279,199 B1 | * | 8/2001 | Plate ..................... | B60B 33/045 16/19 |
| 6,892,421 B2 | * | 5/2005 | Cooper ................. | B60B 33/045 16/18 A |
| 7,648,150 B2 | * | 1/2010 | Chen ..................... | B60B 33/045 16/35 R |
| 8,490,243 B2 | * | 7/2013 | Guo .......................... | B62B 9/18 16/35 D |
| 8,839,487 B2 | * | 9/2014 | Plate ..................... | B60B 33/045 16/32 |
| 2006/0117524 A1 | * | 6/2006 | Yan ....................... | B60B 33/045 16/44 |
| 2007/0143957 A1 | * | 6/2007 | Baek ..................... | B60B 33/045 16/44 |

FOREIGN PATENT DOCUMENTS

| | | | |
|---|---|---|---|
| CN | 204262477 U | * | 4/2015 |
| JP | 2012101650 A | * | 5/2012 |

* cited by examiner

*Primary Examiner* — Chuck Y Mah
(74) *Attorney, Agent, or Firm* — Egbert Law Offices, PLLC (57) ABSTRACT

A shockproof caster has a shaft coupling base, a shock-absorbing mechanism and two casters. The shock-absorbing mechanism is disposed in parallel with the shaft coupling base, and the two casters are respectively mounted on the shock-absorbing mechanism. The shock-absorbing mechanism includes: a base body; a connecting arm, with its one end rotatably mounted on the base body; a rotating base, rotatably mounted on the other end of the connecting arm; at least one limiting convex portion, configured on the base body, wherein the top of the limiting convex portion is optionally propped against the outer side of the connecting arm to limit the range of downward swing of the connecting arm; and a spring, configured between the base body and the rotating base.

11 Claims, 8 Drawing Sheets

SHOCKPROOF CASTER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a caster, and more particularly to an innovative structural design of a shockproof caster.

2. Description of Related Art Including Information Disclosed Under 37 CFR 1.97 and 37 CFR 1.98

Most suitcases in the current market are installed with casters. When moving on a rough surface, the shock will cause noises. In consideration of this problem, some suitcase manufacturers have developed a kind of shockproof suitcase caster, which mainly uses springs configured between the suitcase and casters to absorb the shock.

However, in actual applications of such prior-art caster structures, the following problem has been found: because the components of the prior-art caster are assembled one after another along the axial direction, the spring can only absorb shock from the axial direction. If the road surface causes a lateral shock against the wheel, the prior-art caster is unable to absorb the shock. In case of excessive shock, the prior-art caster or other component may deform or break.

BRIEF SUMMARY OF THE INVENTION

The primary objective of the present invention is to provide a shockproof caster with novel structural design that offers ideal practicability. The technical feature of the present invention lies in that said a shockproof caster mainly comprises: a shaft coupling base, a shock-absorbing mechanism and two casters, said shock-absorbing mechanism disposed in parallel with the shaft coupling base, and the two casters are respectively mounted on the shock-absorbing mechanism, said shock-absorbing mechanism including: a base body; a connecting arm, with its one end mounted on the base body in a rotatable style; a rotating base, mounted on the other end of the connecting arm in a rotatable style; at least one limiting convex portion, configured on the base body, with the top of said limiting convex portion optionally propped against the outer side of said connecting arm, to limit the range of downward swing of said connecting arm; and a spring, configured between the base body and the rotating base.

Based on such an innovative and unique design, the present invention gains an advantage over prior art in that, compared to existing casters, the parallel disposition of the shaft coupling base and shock-absorbing mechanism in the present invention offers an additional function to absorb shock forces from the lateral directions, thus avoiding excessive torque and damage caused by external forces. Hence, the present invention can help extend the lifecycle of casters. Moreover, as the first and second positioning bumps can be maintained at relative positions, when the spring is in action, twist is less likely and damage can be avoided. Therefore, the present invention offers a practical inventive step and good commercial value.

The present invention discloses "a shockproof caster" which mainly comprises a shaft coupling base, a shock-absorbing mechanism, and casters. Based on such an innovative and unique structural design and the associated technical features, the present invention gains an advantage over the structures set forth in prior art. As the shaft coupling base and shock-absorbing mechanism are disposed in parallel, comparing to the existing casters, the present invention offers an additional function to absorb shock forces from the lateral directions, avoiding excessive torque and damage caused by external forces, and consequently extend the lifecycle of the casters; moreover, as the first and second positioning bumps can be maintained at relative positions, when the spring is in action, twist is less likely and damage can be avoided. Therefore, the present invention offers a practical inventive step and good commercial value.

DETAILED DESCRIPTION OF THE INVENTION

FIGS. 1 to 4 illustrate a preferred embodiment of the present invention of a shockproof caster. However, it is to be understood that such an embodiment is illustrative only and is not intended to limit the scope of the present invention or claims in any way. Said shockproof caster comprises a shaft coupling base 10, a shock-absorbing mechanism 20 and two casters 30. The shock-absorbing mechanism 20 is disposed in parallel with the shaft coupling base 10, and the two casters 30 are respectively configured on the shock-absorbing mechanism 20, wherein said shaft coupling base 10 is for connection with a steering shaft 11 that is pivotally connected to the bottom of an object 40. Said object 40 can be, but is not limited to, a suitcase or a seat.

Said shock-absorbing mechanism 20 includes a base body 21, a connecting arm 22, a rotating base 23, at least one limiting convex portion 24 and a spring 25, wherein, said base body 21 extends outward from the shaft coupling base 10, and the periphery of the base body 21 on the opposite sides are extended to form two opposite side boards 211, so that the base body 21 is in a shape, and encompasses a housing space 212. A shaft hole 213 is configured on both side boards 211 at a position near the bottom of the shaft coupling base 10. And a first positioning bump 214 is configured on the base body 21 at a position near the top of the housing space 212.

By position, said connecting arm 22 defines a first pivoting section 221, a second pivoting section 222 and a connecting section 223 between the first and second pivoting sections 221, 222, wherein, said first pivoting section 221 is located between the two side boards 211, said first pivoting section 221 is configured with a first pivot hole 224. Using a shaft 26 to go through the two shaft holes 213 and the first pivot hole 224, the connecting arm 22 can be rotatably mounted on the base body 21. The free end of the second pivoting section 222 is configured with a holding slot 225. Said holding slot 225 extends toward the connecting section 223. Said second pivoting section 222 is configured with a second pivot hole 226 that goes through the holding slot 225. One side of said second pivoting section 222 relative to the connecting arm 22 protrudes outward.

The top of said rotating base 23 is configured with a second positioning bump 231 that is positioned opposite to the first positioning bump 214. Said second positioning bump 231 is a conic structure, and by position, defines a catching section 232 and a contraction section 233. Said catching section 232 is provided for the spring 25 to be stably fitted on the second positioning bump 231, while said contraction section 233 provides a space for the spring 25 to swing slightly, so as to avoid unsmooth action due to the interference generated during the slight swing of the spring 25. And the bottom of the rotating base 23 extends outward to form a long pivoting block 234. Said long pivoting block 234 is inserted into the holding slot 225. In particular, said long pivoting block 234 is configured with a third pivot hole 235 that corresponds to the second pivot hole 226. The opposite sides of the long pivoting block 234 are inclined surfaces to form a relative contraction. In this embodiment, the bottom of the connecting section 223 of the rotating base 23 extends outward to form a stopping convex block 227 corresponding to the limiting convex portion 24, and the inner periphery of the stopping convex block 227 is optionally propped against the free end surface of the limiting convex portion 24, thus realizing a fixed positioning.

Said limiting convex portion 24 is configured on the base body 21 at a position near and below the shaft hole 213. The top of the limiting convex portion 24 is optionally propped against the outer side of the connecting arm 22 to limit the range of downward swing of the connecting arm 22. Apart from supporting and limiting the connecting arm 22, the limiting convex portion 24 can also avoid excessive swing angles of the connecting arm 22, which may result in separation or fall of members of the shock-absorbing mechanism 20.

Said spring 25 is configured between the base body 21 and the rotating base 23, and is located inside the housing space 212. The two ends of the spring 25 are respectively attached to the first positioning bump 214 and second positioning bump 231. The spring 25 provides an elastic limiting force for the first and second positioning bumps 214, 231, so that the first and second positioning bumps 214, 231 are maintained in relative positions. In this embodiment, the spring 25 is a compression spring 25. It solves the problem that the connecting point is easily damaged in prior-art casters which use an extension spring.

Said caster 30 has a wheel hole 31. A wheel shaft 32 is used to go through the second pivot hole 226 of the second pivoting section 222, the third pivot hole 235 of the long pivoting block 234 and the wheel holes 31 of the two casters 30, so that the rotating base 23 and the two casters 30 are respectively attached to the connecting arm 22 in a rotatable style. The outer side of said two casters 30 is configured with a detachable wheel housing 33.

Figure 1:
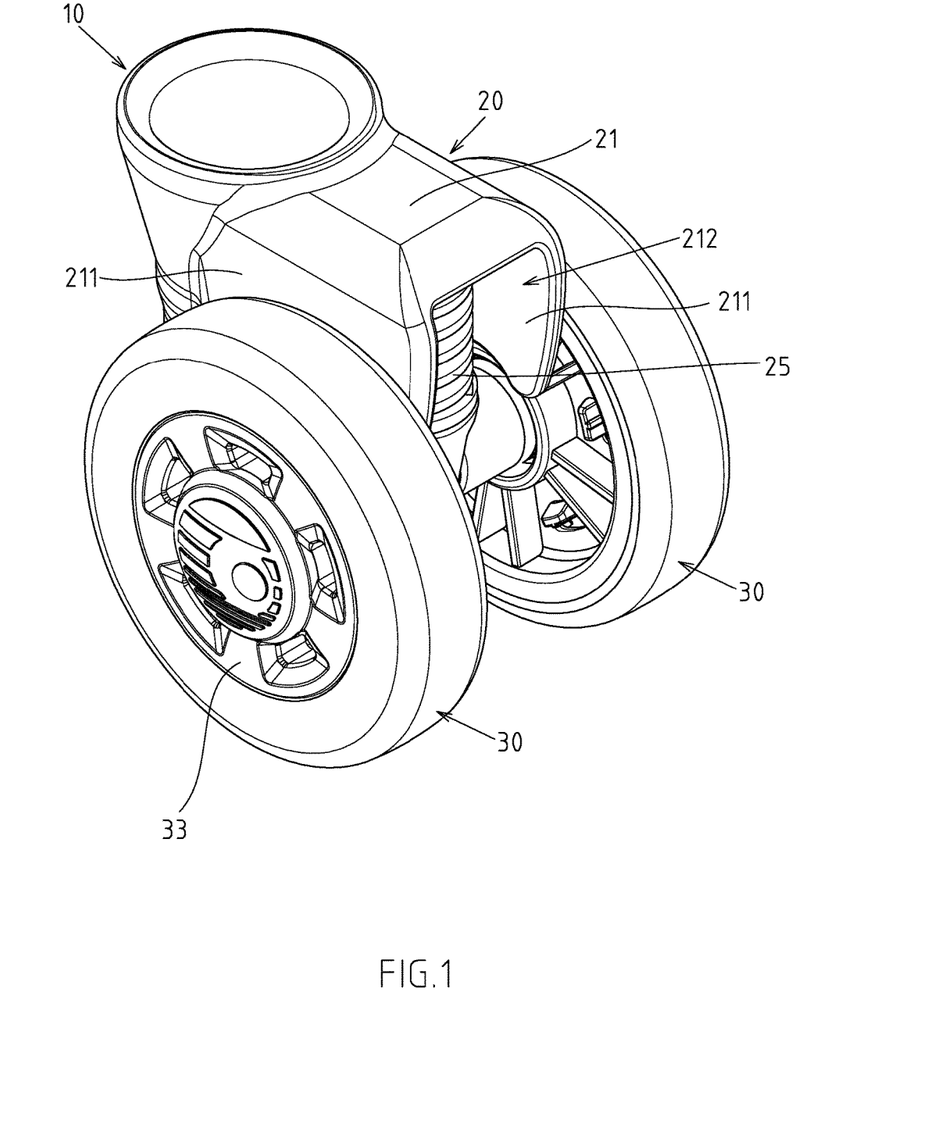
FIG. 1 is a combined perspective view of a preferred embodiment of the present invention of a shockproof caster.
Figure 1A:
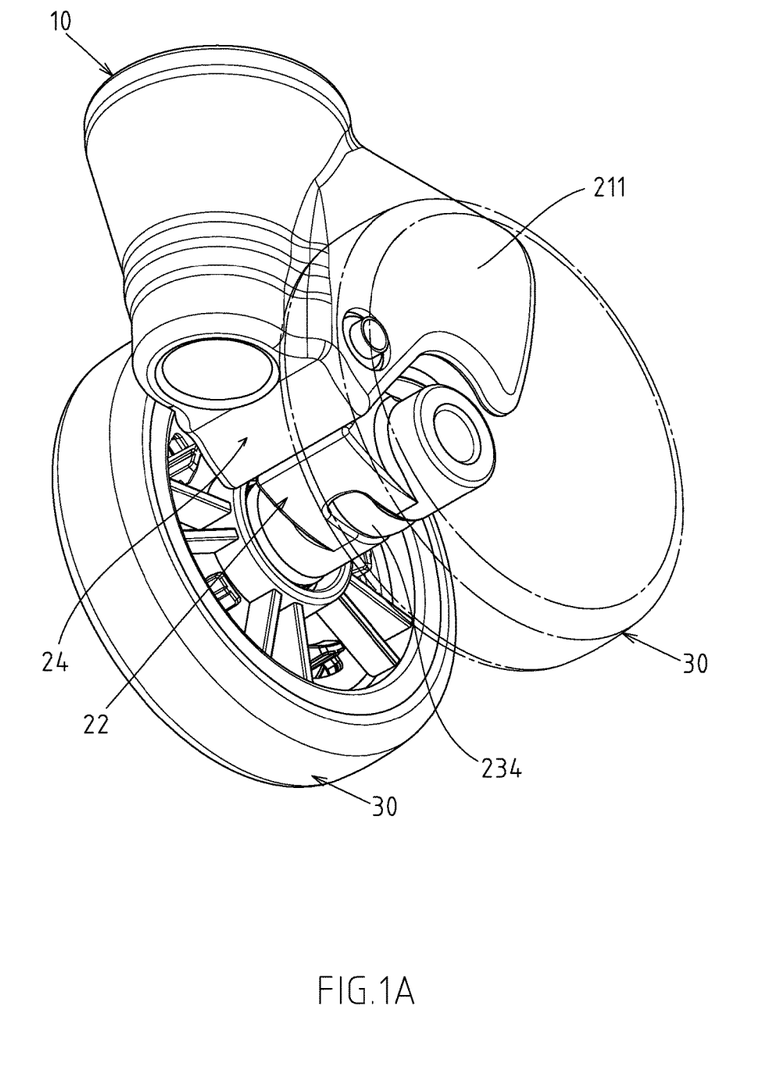
FIG. 1A is a perspective view of FIG. 1 from another angle.
Figure 2:
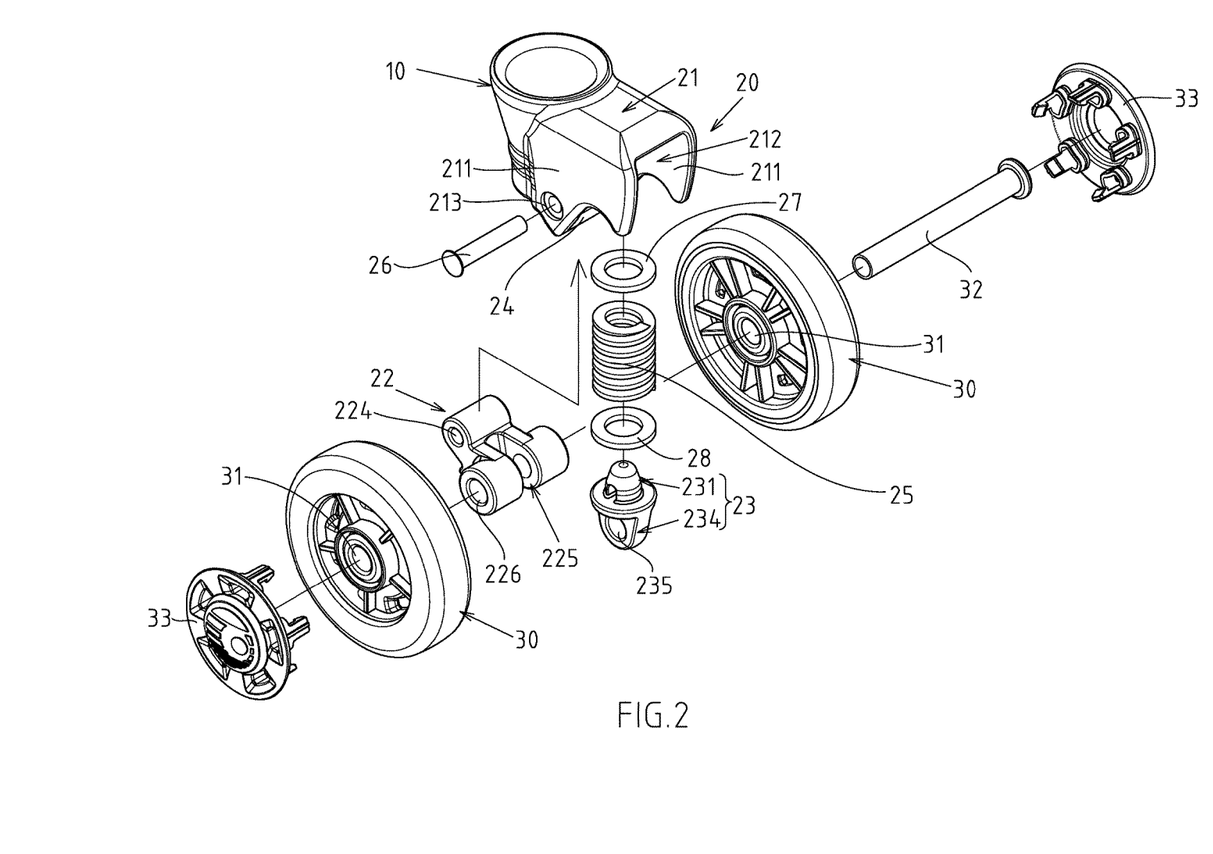
FIG. 2 is an exploded perspective view of FIG. 1.
Figure 3:
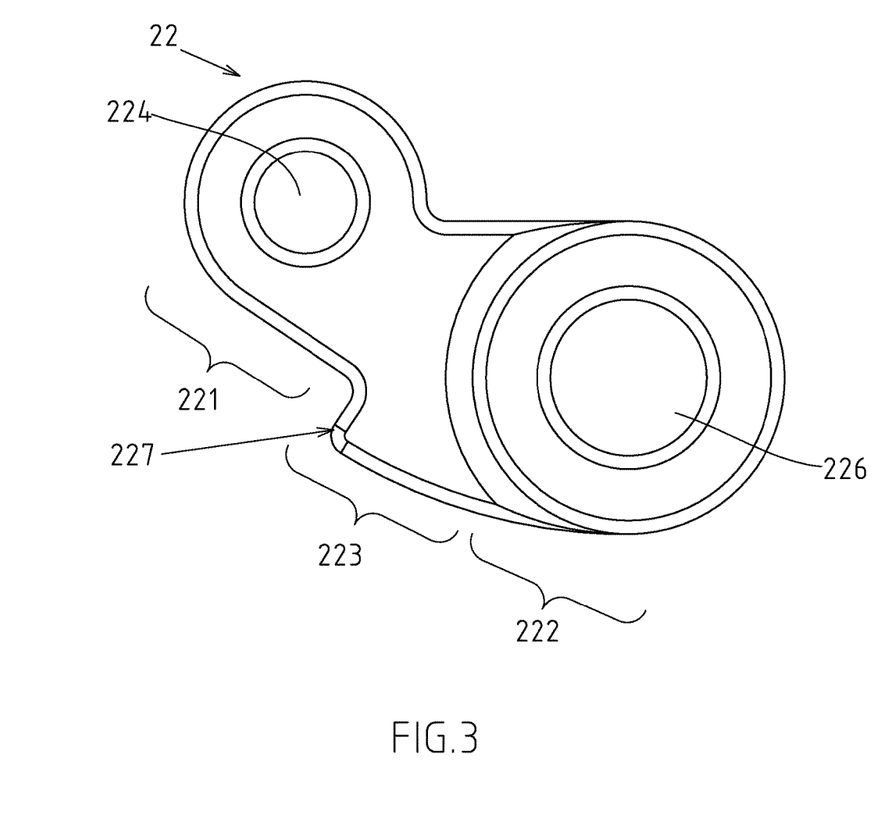
FIG. 3 is a side view of the connecting arm of the present invention.
Figure 4:
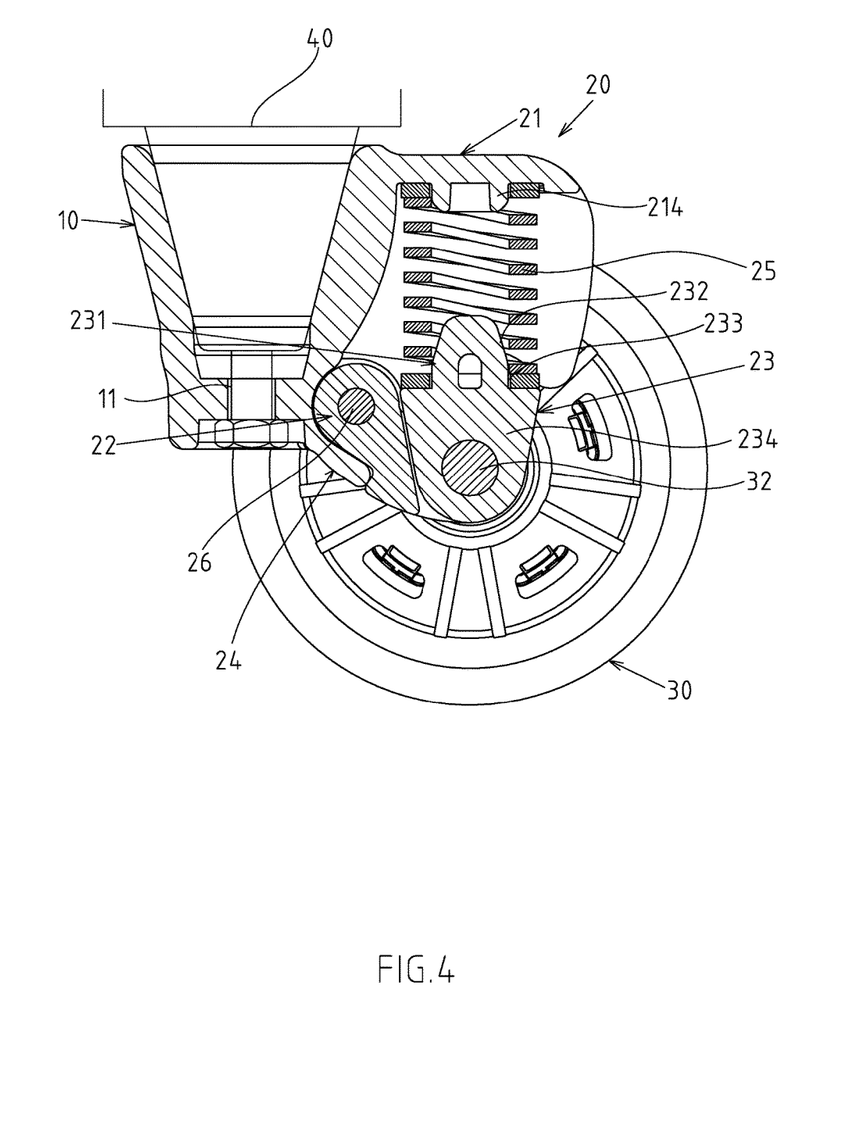
FIG. 4 is a side view of the present invention, indicating the collocation between the shaft coupling base and the object.

Referring to FIGS. 2 and 4, in this embodiment, the shock-absorbing mechanism 20 further comprises a first gasket 27 and a second gasket 28. Said first gasket 27 is configured between the base body 21 and the spring 25 and sleeved on the first positioning bump 214, while said second gasket 28 is configured between the rotating base 23 and the spring 25 and sleeved on the second positioning bump 231. Said first and second gaskets 27, 28 provide a function to protect the base body 21 and the rotating base 23 from scratching by the spring 25.

Based on the above structural constitution, the operation of the present invention is described as below: with reference to FIG. 4, when the caster 30 receives an external impact (for example: am impact from a sudden bump that the caster 30 runs into when moving on the road), the connecting arm 22 of the shock-absorbing mechanism 20 will rotate around the shaft 26 as the fulcrum, and the connecting arm 22 will drive the rotating base 23 connected thereto to rise and compress the spring 25, which absorbs the shock from the caster 30. Through this operation, the shock-absorbing mechanism 20 can absorb external forces from different directions, offering an optimal effect of shock absorption and noise reduction.

Figure 5:
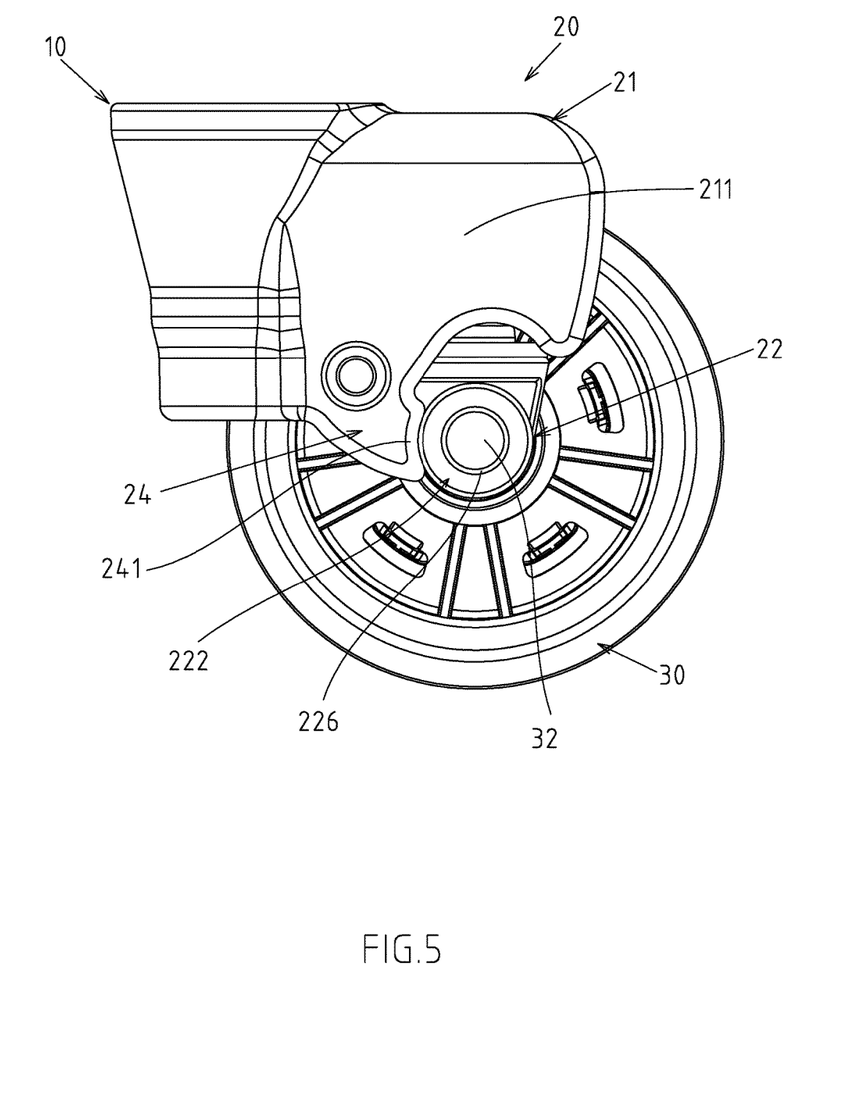
FIG. 5 is a side view of another variation of the embodiment of the limiting convex portion of the present invention.

FIG. 5 illustrates another embodiment of the present invention. This embodiment differs from the preferred embodiment mainly in that, the limiting convex portion 24 extend toward the second pivoting section 222 to form at least one propping end 241, and said propping end 241 is optionally propped against the second pivoting section 222, so as to limit the scope of downward swing of the connecting arm 22.

Figure 6:
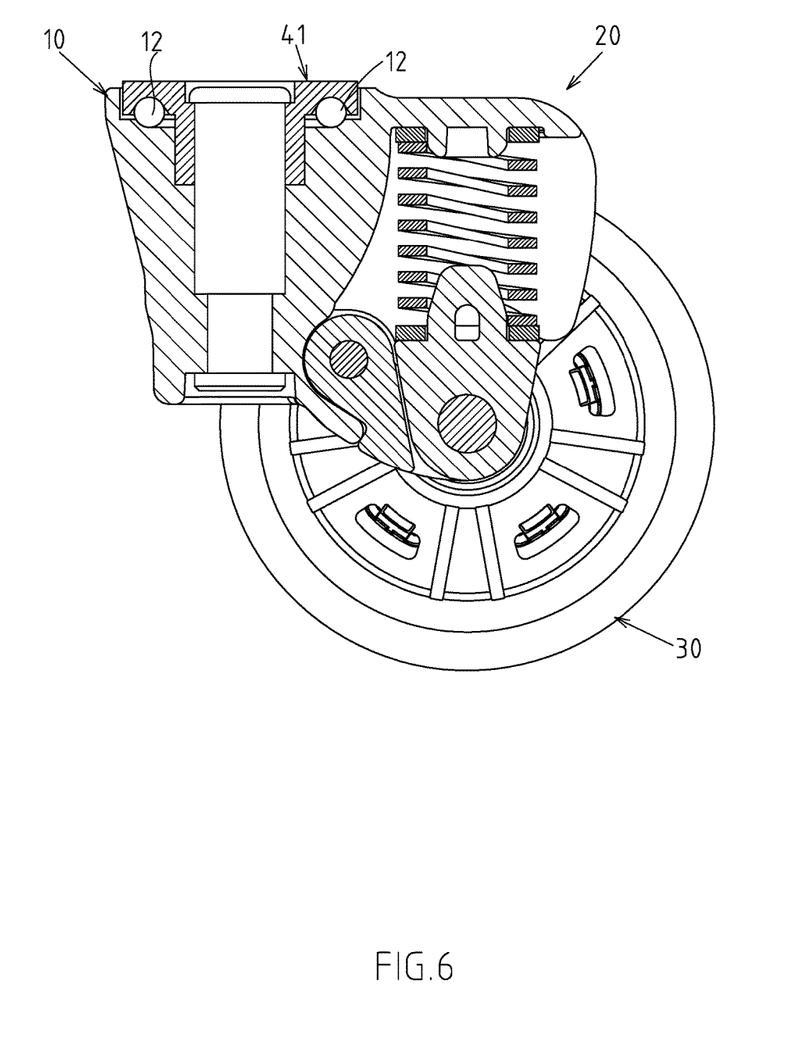
FIG. 6 is a side view of another variation of the embodiment of the collocation between the shaft coupling base and the object.

FIG. 6 illustrates another embodiment of the present invention. This embodiment differs from the preferred embodiment mainly in that, the top of the shaft coupling base 10 houses a plurality of balls 12, and the object 40 (omitted in the drawing) is configured with a connecting portion 41. Connection is made through the connecting portion 41 to the shaft coupling base 10, so that rotation is enabled via the balls 12.

Figure 7:
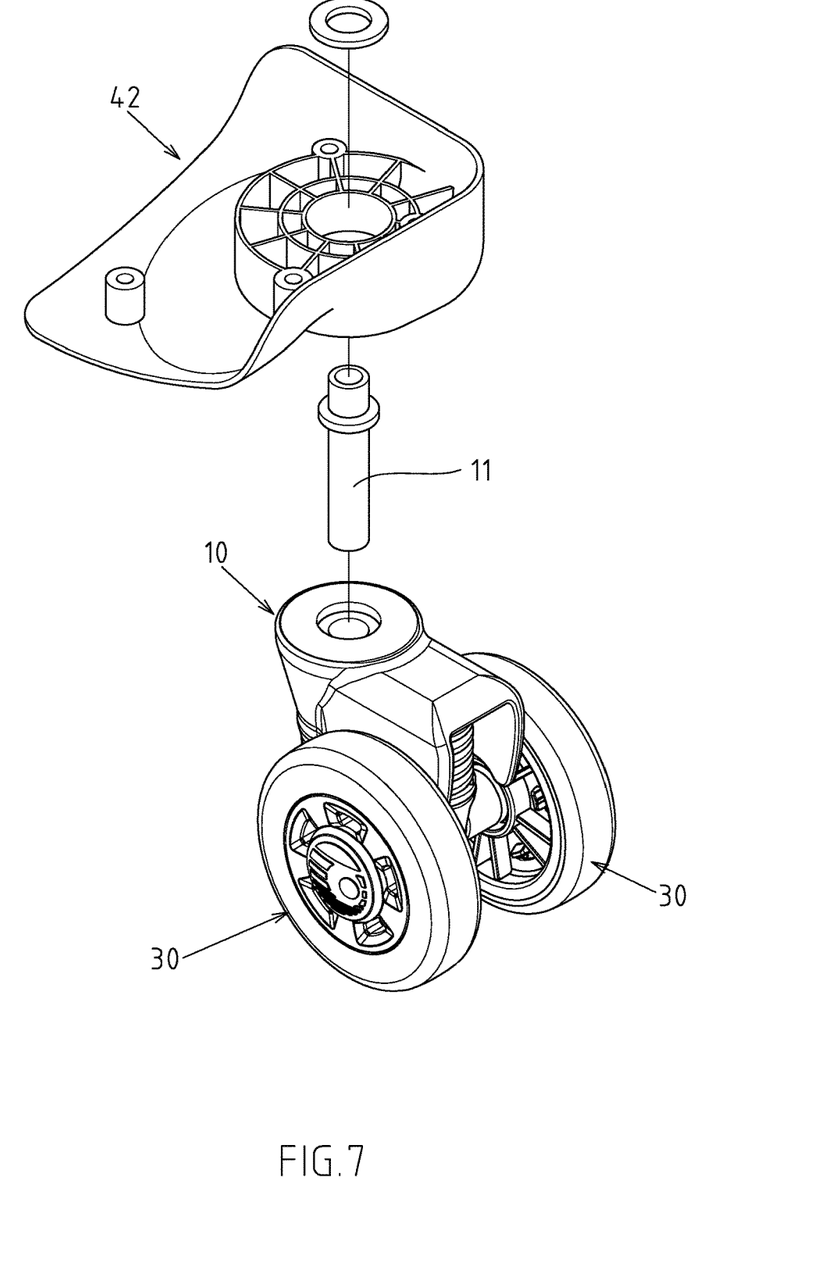
FIG. 7 is a side view of another variation of the embodiment of the collocation between the shaft coupling base and the object.

FIG. 7 illustrates another embodiment of the present invention. The main difference between this embodiment and the preferred embodiment is that, the object 40 (omitted in the drawing) is configured with a base 42, and the base 42 is rotatably mounted on the shaft coupling base 10 via a steering shaft 11.

I claim:
1. A shockproof caster, comprising:
   a shaft coupling base, for connection with a steering shaft that is pivoted on the bottom of an object;

a shock-absorbing mechanism, disposed in parallel with the shaft coupling base, said shock-absorbing mechanism including:

a base body, extending outward from the shaft coupling base, the periphery of the base body on the opposite sides are extended to form two opposite side boards, so that the base body is in an inverted U shape, and encompasses a housing space; a shaft hole is configured on both side boards at a position near the bottom of the shaft coupling base; a first positioning bump is configured on the base body at a position near the top of the housing space;

a connecting arm, which defines a first pivoting section, a second pivoting section and a connecting section between the first and second pivoting sections by position, wherein said first pivoting section is configured between the two side boards, said first pivoting section is configured with a first pivot hole; using a shaft that goes through the two shaft holes and the first pivot hole, the connecting arm can be rotatably mounted on the base body; the free end of the second pivoting section is configured with a holding slot; said holding slot extends toward the connecting section; said second pivoting section is configured with a second pivot hole that goes through the holding slot;

a rotating base, with its top configured with a second positioning bump that is positioned opposite to the first positioning bump, and its bottom extending outward to form a long pivoting block; said long pivoting block is inserted into the holding slot, and the long pivoting block is configured with a third pivot hole that corresponds to the second pivot hole;

at least one limiting convex portion, configured on the base body at a position near and below the shaft hole; the top of the limiting convex portion is optionally propped against the outer side of the connecting arm to limit the range of downward swing of the connecting arm; and a spring, configured between the base body and the rotating base, and located inside the housing space; the two ends of the spring are respectively attached to the first positioning bump and the second positioning bump; the spring provides an elastic limiting force for the first and second positioning bumps, so that the first and second positioning bumps are maintained in relative positions; and two casters, each having a wheel hole; a wheel shaft is used to go through the second pivot hole of the second pivoting section, the third pivot hole of the long pivoting block and the wheel holes of the two casters, so that the rotating base and the two casters are respectively attached to the connecting arm in a rotatable style.

2. The structure defined in claim 1, wherein, the bottom of the connecting section of said connecting arm is extended to form a stopping convex block corresponding to the limiting convex portion, and the inner periphery of the stopping convex block is optionally propped against the free end surface of the limiting convex portion.

3. The structure defined in claim 1, wherein one side of said second pivoting section relative to the connecting arm protrudes outward, and the limiting convex portion extends toward the second pivoting section to form a propping end; said propping end is optionally propped against the second pivoting section to limit the range of downward swing of the connecting arm.

4. The structure defined in claim 2, wherein said second positioning bump is a conic structure, and by position, defines a catching section and a contraction section; said catching section is provided for the spring to be stably fitted on the second positioning bump, and the contraction section provides a space for the spring to swing slightly.

5. The structure defined in claim 3, wherein said second positioning bump is a conic structure, and by position, defines a catching section and a contraction section; said catching section is provided for the spring to be stably fitted on the second positioning bump, and the contraction section provides a space for the spring to swing slightly.

6. The structure defined in claim 4, wherein said shock-absorbing mechanism further comprises a first gasket and a second gasket; said first gasket is configured between the base body and the spring and sleeved on the first positioning bump, while said second gasket is configured between the rotating base and the spring and sleeved on the second positioning bump.

7. The structure defined in claim 5, wherein said shock-absorbing mechanism further comprises a first gasket and a second gasket; said first gasket is configured between the base body and the spring and sleeved on the first positioning bump, while said second gasket is configured between the rotating base and the spring and sleeved on the second positioning bump.

8. The structure defined in claim 6, wherein the opposite sides of said long pivoting block are inclined surfaces to form a relative contraction.

9. The structure defined in claim 7, wherein the opposite sides of said long pivoting block are inclined surfaces to form a relative contraction.

10. The structure defined in claim 8, wherein the outer side of said two casters is configured with a detachable wheel housing.

11. The structure defined in claim 9, wherein the outer side of said two casters is configured with a detachable wheel housing.

* * * * *